(12) United States Patent
Hehl

(10) Patent No.: US 6,406,286 B1
(45) Date of Patent: Jun. 18, 2002

(54) INJECTION MOULDING UNIT FOR AN INJECTION MOULDING MACHINE

(76) Inventor: Karl Hehl, Arthur-Hehl-Str. 32, D-72290 Lossburg (DE)

( * ) Notice: Subject to any disclaimer, the term of this patent is extended or adjusted under 35 U.S.C. 154(b) by 0 days.

(21) Appl. No.: 09/463,555
(22) PCT Filed: Jul. 21, 1998
(86) PCT No.: PCT/EP98/04574
§ 371 (c)(1),
(2), (4) Date: May 22, 2000
(87) PCT Pub. No.: WO99/04947
PCT Pub. Date: Feb. 4, 1999

(30) Foreign Application Priority Data

Jul. 24, 1997 (DE) .......................... 197 31 833

(51) Int. Cl.⁷ ............................... B29C 45/77
(52) U.S. Cl. ...................................... 425/145
(58) Field of Search ................... 425/145, 149

(56) References Cited

U.S. PATENT DOCUMENTS

| 3,806,294 A | | 4/1974 | Hehl | |
| 5,206,034 A | * | 4/1993 | Yamazaki | 425/145 |
| 5,421,712 A | | 6/1995 | Laing et al. | |
| 5,916,602 A | * | 6/1999 | Klaus | 425/145 |
| 6,149,418 A | * | 11/2000 | O'Bryan | 425/145 |

FOREIGN PATENT DOCUMENTS

| EP | 0 752 303 A1 | 1/1997 |
| WO | WO 97 18938 A | 5/1997 |

* cited by examiner

*Primary Examiner*—Tim Heitbrink
(74) *Attorney, Agent, or Firm*—Cantor Colburn LLP

(57) ABSTRACT

An injection-molding unit having an injection motor to activate an electromechanical injection unit for axial movement of the feed screw. An electromechanical rotary motor is provided to turn the feed screw independently of the axial movement. The rotary motor and the injection motor work via a first drive element and a drive element coaxial to the first drive element to make the feed screw move. To transmit the axial movement to the feed screw by linear movement of the injection unit, there is an axial bearing element directly between the first drive element and the other drive element. The axial bearing element is a force-transmission element, but at the same time allows the drive elements to rotate independently of one another and, if necessary, at the same time. This is a simple way of permitting compact coupling of the drive elements for dosing and injection on an injection-molding unit.

13 Claims, 5 Drawing Sheets

INJECTION MOULDING UNIT FOR AN INJECTION MOULDING MACHINE

FIELD OF INVENTION

The invention concerns an injection-molding unit for an injection-molding machine to process compounds that can be plasticized such as plastics, ceramic compounds or other powdered compounds.

BACKGROUND OF THE INVENTION

This type of injection-molding unit is known from EP 0 752 303 A1, which uses an electromechanical injection-molding unit to inject the plasticizable compound into the hollow space of a mold clamped into a mold-closing unit and an electromechanical rotary motor to turn a conveyor. The injection unit sits on a support, which is connected to a carrier block via cross beams. These cross beams are used to guide an injection bridge. The conveyor and the ball roll spindle of the injection-molding unit are coaxial to one another. The rotary motor and the injection motor are both arranged on the injection bridge and move with it. They transmit their drive torque to drive elements arranged coaxial to one another and coaxial to the spray axis. Both conveyor worms and ball roll spindles are rotary-mounted on the injection bridge. That way, no radial forces are transmitted from the injection bridge to the cross beams, which is essential to detect the reaction forces there, but this involves considerable expense for rotary mounting the conveyor and the spindle. Since the bearings are not in a housing, it is difficult to protect them from getting dirty. Since the force needed to move the injection bridge axially is transmitted by tapering the spindle, bearing and spindle sheath back to the worm, many different components must be assembled at some expense, so this unit cannot be made in a modular design. The mounting is done so that the bearings that absorb the relatively high forces during the axial movement of the worm, are inside, while the bearings that absorb the comparatively lower dosing forces are outside. This arrangement of the bearings basically parallel to one another is a disadvantage.

It is also known from DE 43 44 335 A1 how to arrange electromechanical drives to make the worm rotate and make the worm move axially with their axes flush with the axis of the worm. To make this possible, at least one of the motors must be a hollow shaft motor, so that despite its compact design, it is expensive.

SUMMARY OF THE INVENTION

Starting from this state of the art, the problem of this invention is to create a simple, compact coupling of the drive elements for dosing and injecting on an injection-molding unit.

This problem is solved by the features of the injection-molding unit of the present invention.

Compared to the known embodiments, the rotating mountings are now no longer mounted separately by themselves, but are now mounted axially between the two drive elements, which makes it possible for the axial forces to be transmitted directly. This saves one bearing element, on one hand; and on the other hand, the local proximity gained thereby creates the structural conditions for the drive element to be arranged in a housing (claim 4), since that element effectively protects it from outside influences. However, it also creates the conditions so that a largely modular design with many structurally equal parts is possible. Arranging the axial bearing element directly between the first drive element and the other one makes a space-saving design possible, on one hand, and, on the other hand, where high axial forces occur during the axial movement of the worm, larger bearings can be provided, while smaller bearings can be used for the dosing forces. This is more compatible with the forces that actually occur than is usual in the state of the art.

Although the same parts are also arranged largely symmetrically to the spraying axis to make the load on the injection-molding unit symmetrical, in the design in claims 7 to 10, the forces are effectively reduced by assigning a planet gear to the means of linear movement. To protect this drive from outside influences, it can be surrounded by a pipe so that it looks like a piston/cylinder unit on the outside.

BRIEF DESCRIPTION OF THE FIGURES

The invention will be explained in greater detail below using the figures.

DETAILED DESCRIPTION OF THE PREFERRED EMBODIMENT

The invention will now be explained in greater detail with examples, referring to the attached drawings. The examples of embodiment are only examples and do not limit the inventive concept to a certain physical arrangement.

Figure 1:
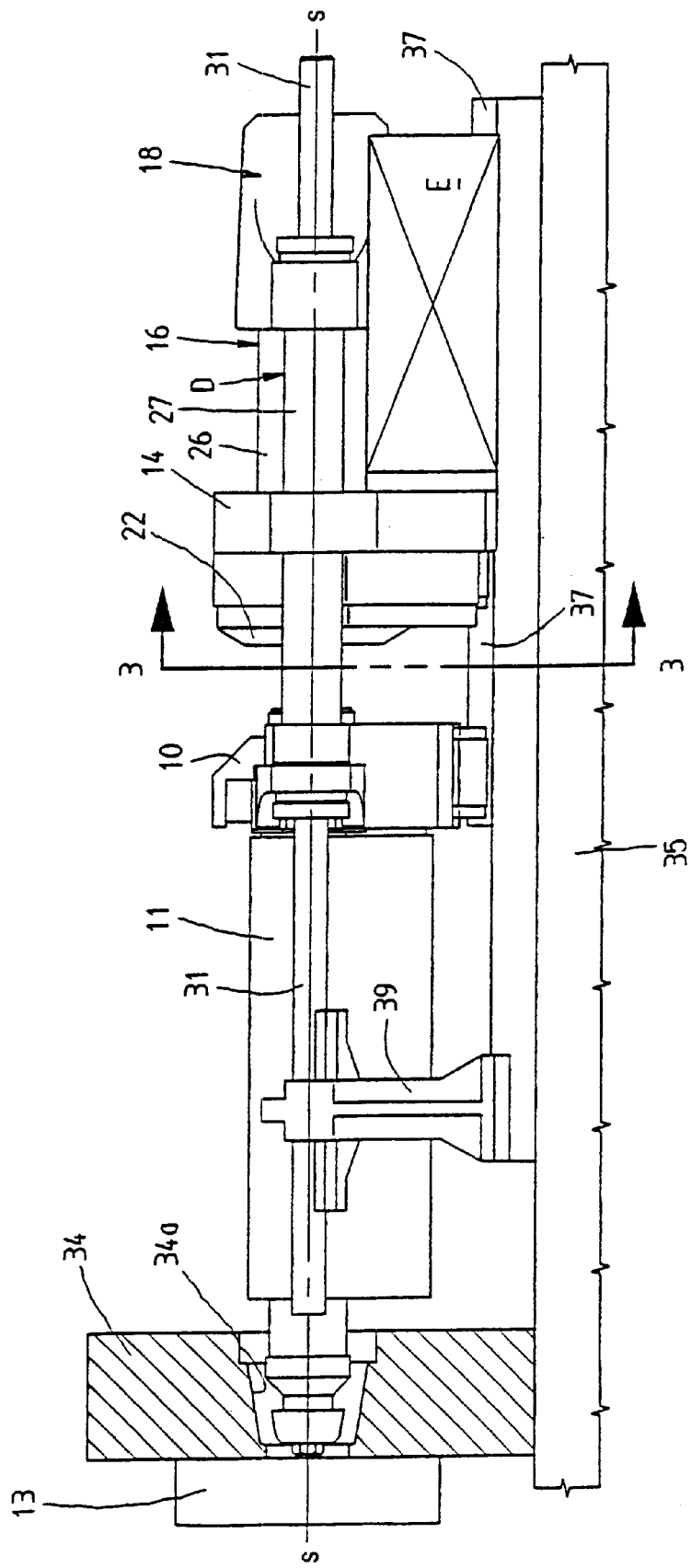
FIG. 1 shows a side view of an injection-molding unit supported on a machine base and set next to a mold in side view.

The injection-molding unit shown schematically in FIG. 1 is an integral part of an injection-molding machine and is thus arranged on the base 35 of that injection-molding machine. It goes through a hole 34a in a stationary mold holder 34, on which part of the mold 13 is visible on the left side. The injection-molding unit itself is used on an injection-molding machine to process plasticizable compounds, basically to inject those compounds, such as plastics, ceramic compounds or other powdered compounds into the hollow space in the mold 13.

Figure 2:
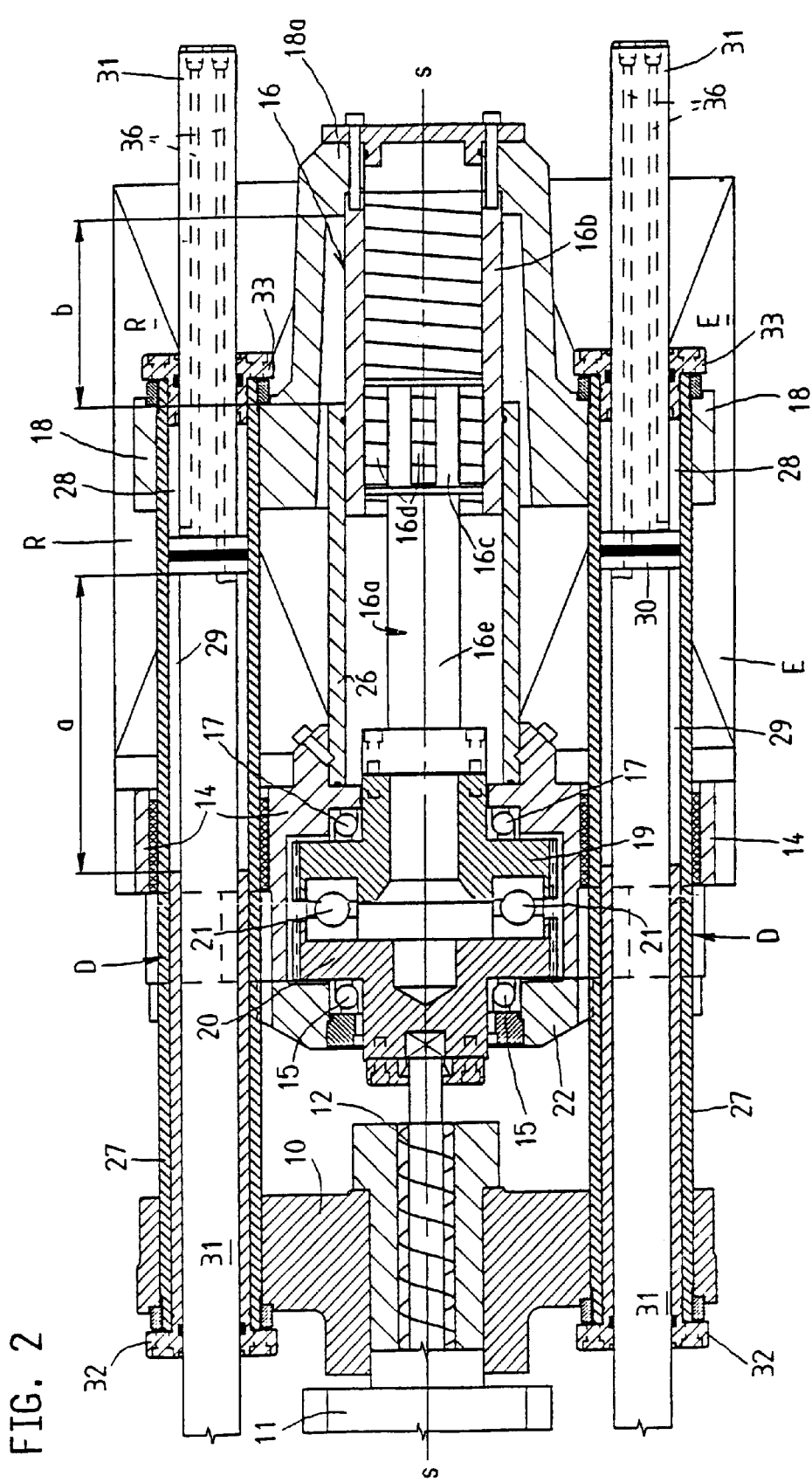
FIG. 2 shows an enlarged section along Line 2—2 in FIG. 3.

In FIG. 1, the injection-molding machine has a carrier block 10 to hold a plasticizing cylinder 11. The conveyor shown in FIG. 2 is arranged in the plasticizing cylinder 11 along the spray axis s-s. This conveyor 12 is used to inject the plasticizable compounds into the mold 13. An injection bridge 14 is arranged via cross beams 31 on cylinders 27 axially so it can move in the direction of the spray axis s-s. In FIG. 2, the conveyor 12 is mounted so it can rotate on this injection bridge 14 via at least one bearing element 15. The injection bridge 14 is moved axially by an electromechanical injection unit 16. FIG. 2 shows how the injection unit 16 works; its means of linear movement 16a is mounted so it can rotate on the injection bridge via at least one bearing element 17.

On the right end of the injection-molding unit, there is a supporting element 18 to support element 16b which works with the means of linear movement 16a so it cannot turn. An injection motor E turns the means of linear movement 16a by means of a first drive element 19 coaxial to it. FIG. 2 shows at the top right an electromechanical rotary motor R, which is intended to start the rotational movement of the conveyor 12. This takes place by means of another drive element 20, which is coaxial to the center axis of the conveyor 12 and also coaxial to the first drive element 19. In this way, the conveyor 12, the first drive element 19 and the other drive element 20, and the means of linear movement 16a of the injection unit lie on one axis, spray axis s-s.

While the bearing elements 15 and 17 are basically intended to permit the radial movement of the drive element that occurs during dosing, directly between the two drive elements 19, 20, there is an axial bearing element 21 as a force-transmission element to transmit forces during the axial movement of the means of linear movement 16a. If the means of linear movement 16a is moved, then the force flux from the means of linear movement goes to the drive element 19 connected to the means of linear movement and from it via axial bearing element 21 to the other drive element 20 and from there to the conveyor 12. This axial bearing element 21 must thus transmit the relatively high axial forces. At the same time, it makes it possible for the two drive elements 19, 20 to turn independently of one another. This is necessary during the plasticization of material, since when the conveyor 12 is rotating, an axial force-governed movement of the conveyor 12 must be completed at the same time. In this case, both drive elements 19, 20 can then be moved at the same time, but independently of one another. This is possible due to the fact that the axial bearing element 21 is also designed as a means of separation to uncouple the turning movements of the drive elements 19, 20.

Figure 4:
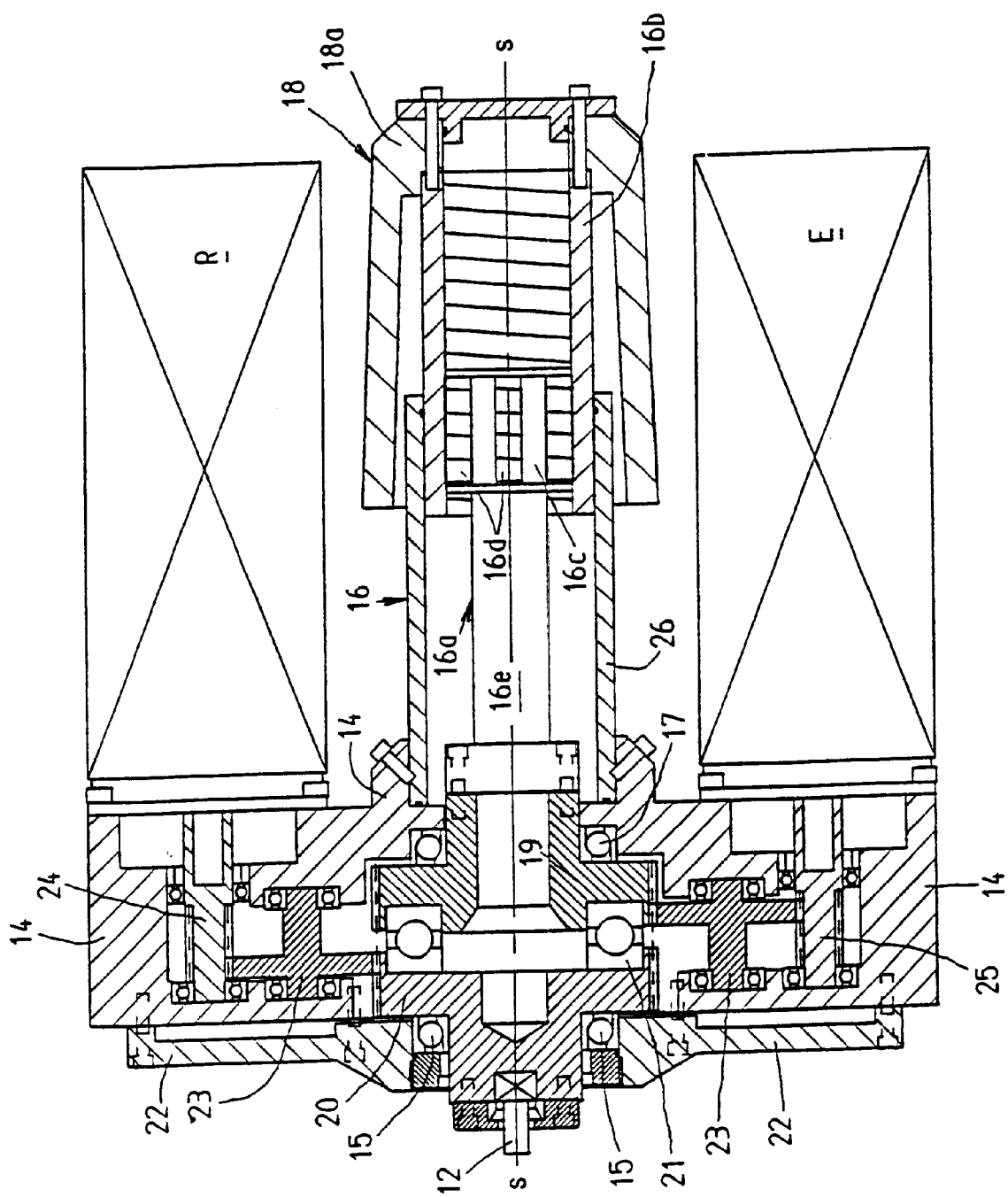
FIG. 4 shows an angled section along line 4—4 in FIG. 3.

FIG. 2 shows that the different bearing elements 15, 17 and the axial bearing element 21 are arranged almost in series one after another. Nevertheless, by direct intermediate connection of the axial bearing element 21 between the two drive elements 19, 20, a compact design is possible, so that the first drive element 19 and the other drive element 20 can be arranged together in a housing in the injection bridge 14. This housing is closed by housing cover 22 in the direction of the carrier block, which is best shown in FIG. 4. The drive elements 19, 20 are identical in terms of their diameters and are toothed wheels in the example of embodiment. The drive elements 19, 20 can be driven by the drive toothed wheels 24, 25 of the injection motor E or the rotary motor R via intermediate toothed wheels 23. The injection motor and the rotary motor are attached to the injection bridge 14 and are moved with the injection bridge 14. In FIG. 4, this design not only makes it possible to protect both gears in a common housing, it also largely creates the conditions for using structurally identical parts. Thus FIG. 4 shows that the two intermediate toothed wheels 23 are structurally identical and the housing in the injection bridge, which is symmetrical to the spray axis s-s, holds these two intermediate toothed wheels 23 at the same site symmetrically. The two intermediate toothed wheels 23 are turned only 180° to one another and are also in turn mounted symmetrically to spray axis s-s.

Figure 3:
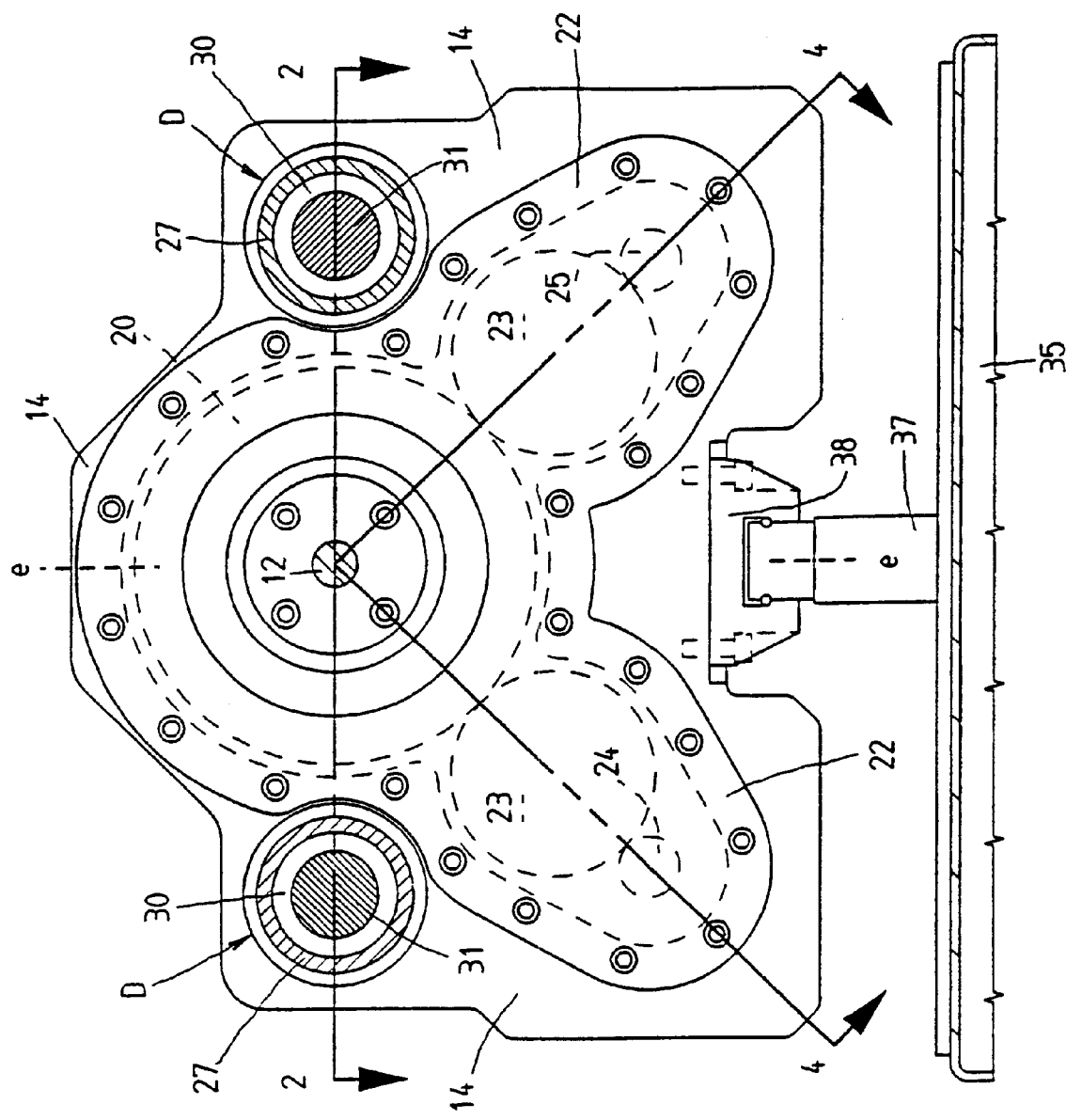
FIG. 3 shows an enlarged section along line 3—3 in FIG. 1.

Likewise, the injection motor E and the rotary motor R are largely structurally identical and are both arranged symmetrically to a plane e-e going through the spray axis. As shown in FIG. 3, they are under the cross beams 31 and basically inside a vertical projection of a surface that extends between the two cross beams 31. However, it is understood that, here again, other arrangements are possible around the spray axis.

The means of linear movement 16a of the injection element 16 has a spindle head 16c. This spindle head is inserted into a threaded case that forms element 16b, which works with the means of linear movement 16a. The threaded case sits on support 18 so it cannot turn, as shown in FIG. 2. Several planet gears 16d that work with it are arranged between the spindle head 16c and the threaded case, so that another reduction is possible here. In this way, both motors, the injection motor E on one hand and the rotary motor R on the other, can be operated at the same rpm limits, and there is a reduction due to the gears formed by the toothed wheels, which can be further reduced by the planet gears for higher forces.

Basically there can be an interplay between the spindle and the spindle nut for the electromechanical drive of the injection unit. However, in the example of embodiment, a form of embodiment is chosen in which a rod 16e has a spindle head 16c, which moves during rotation along with the planet gears inside the threaded case 16b. To protect the rod, planet gears and spindle head from outside influences, the rod 16e is surrounded coaxially by a pipe 26 supported on an injection bridge 14 so it cannot turn. At each position of the injection unit, shown by the maximum injection stroke b (FIG. 2), this pipe goes into a pot-like molded formation 18a of support 18.

The injection-molding unit itself must also be set against the mold. This is done by a hydraulic piston/cylinder unit D, whose cylinders 27 can move axially to the stationary cross beams 31 designed as piston rods. The cylinders 27 form a frame with the carrier block 10 and the support 18. The frame is supported so it can move on the cross beams, which are in turn supported, inter alia, by carriers 39 on the machine base. Likewise, the carrier block 10 is supported on a guide rail 37, which is also used, according to FIG. 3, practically as an additional guide next to the cross beams 31. For this, the injection bridge 14 has a guide wagon 38, which overlaps the center guide rail 37.

The carrier block 10 is set in the frame surrounding the cylinder, carrier block and support in the area near the front cylinder cover 32 and the support 18 in the area near the rear cylinder cover 33. The injection bridge 14 runs axially between the carrier block 10 and the supporting element 18 on cylinders 27 in the piston/cylinder unit D and is secured against rotation. In the example of embodiment, the piston/cylinder unit is driven hydraulically. Here again, it is understood that there can be other ways of driving it, like electromechanical drives, for example, and it should only be ensured that the outside of this drive unit has a guide function. This piston/cylinder unit D can also serve as a guide cylinder unit.

Figure 5:
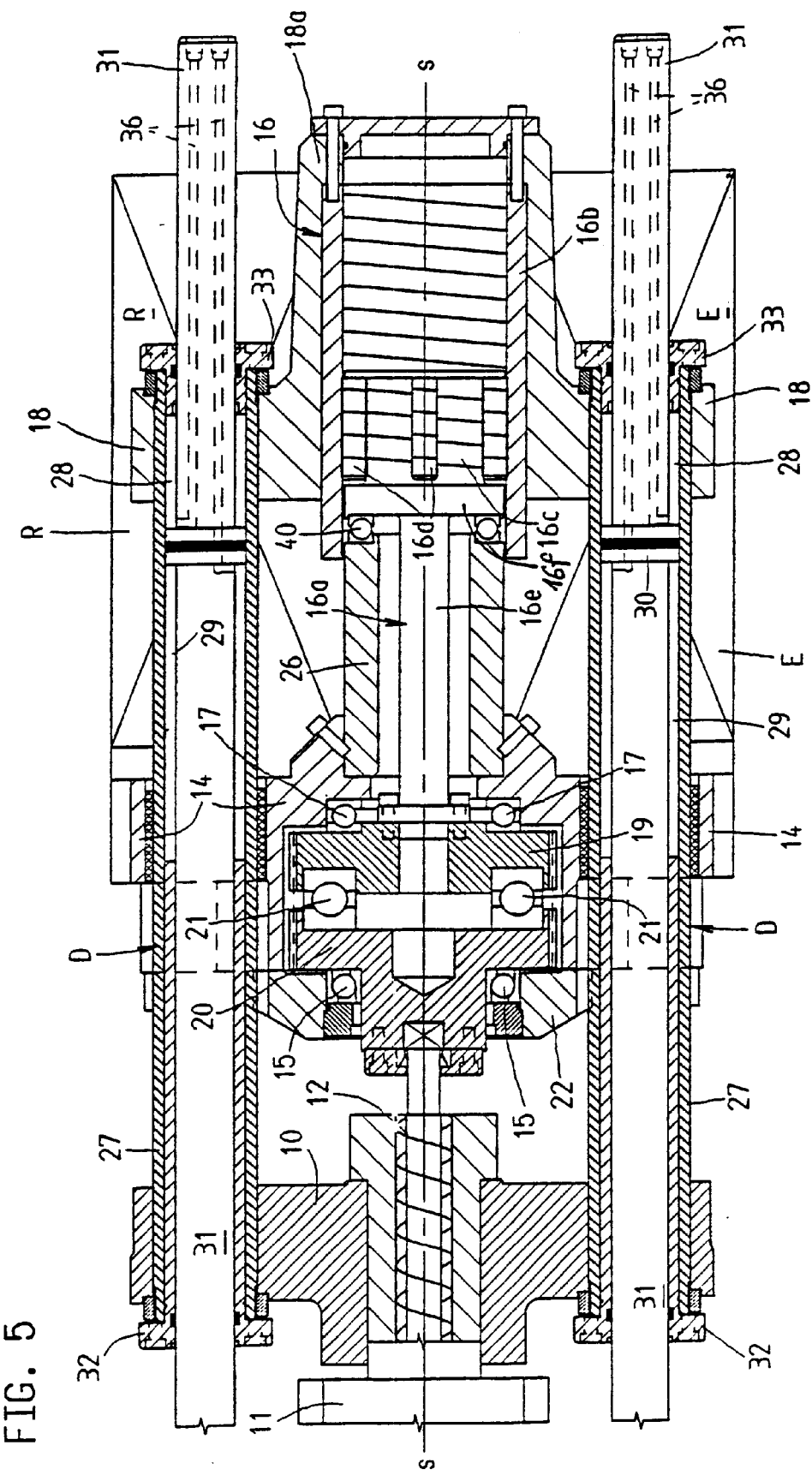
FIG. 5 shows the view in FIG. 2 in another embodiment.

FIG. 5 shows another embodiment. The reference numerals are kept to make it easier to understand, although comparison with FIG. 2 shows that at least the means of linear movement 16a and here especially the rod 16e and the pipe 26 are dimensioned differently. In addition, there is another axial bearing element 40 between the pipe 26 and element 16b. Finally, an axial bearing was made of what was once a radial bearing 17.

These changes are aimed reducing the load on the injection unit 16. As in the first example of embodiment especially, the first drive element 19 is driven by the injection motor. This causes a rotation of the rod 16e and an accompanying movement of the spindle head 16c and the planet gears 16d, which move relative to the threaded case 16b as a result of the rotation. Now here, pipe 26 inserts element 16b, which works with the means of linear movement 16a, into the threaded case. The threaded case and the pipe 26 are indirectly connected to one another via an axial bearing element 40. This means now that the forces that occur when the injection motor E is turned on are not transmitted as they were via rod 16e to drive element 19.

Instead, the forces are transmitted from the threaded case (element 16b) via the planet gears 16d to the spindle head. The spindle head has a band 16f that works on the axial bearing element 40 and transmits the forces to the pipe 26. The pipe 26 then transmits the forces via the bearing element 17 to the first drive element 19, from which the forces are then transmitted, as in the example of embodiment, via the axial bearing element 21 and the other drive element 20 to the conveyor worm 12.

For this, pipe 26 is now dimensioned larger, while rod 16e can be dimensioned smaller, which shows a comparison between FIG. 2 and FIG. 5. This has the advantage that rod 16e of the means of linear movement 16a must no longer be dimensioned for transmission of forces but only for transmission of rotation. This reduces the masses being moved and thus the moment of inertia Since these moments of inertia put more load on it when the injection motor is turned on than the motors that move with it during any movement of the injection bridge (injection motor E, rotary motor R), it is easy to put up with the design of the pipe 26 as a force-transmission pipe.

Both forms of embodiment thus have a symmetrical arrangement of the structural elements to the spray axis s-s. But above all it is possible to apply the injection force directly to the conveyor 12 centrally and coaxially.

The injection-molding unit works in the following way in these forms of embodiment: before the actual injection process, the injection-molding unit is set against the mold 13 by the piston/cylinder unit D. Then, a hydraulic medium is inserted into the cylinder space 29 through one of the bore holes 36. Since the piston rod and the annular piston 30 are stationary, the whole unit moves in the direction of the mold 13. In the next step, dosing, the conveyor worm 12 is turned by the rotary motor R via the other drive element 20. Then the plasticized material goes into the space in front of the conveyor, and the conveyor 12 gradually sets back. The two drive elements 19 and 20 are uncoupled by the axial bearing element. A tapered bearing, spherical roller bearing or similar one can also be used instead of this axial bearing element.

If a corresponding amount of plasticized material was dosed in front of the conveyor worm, the first drive element 19 is activated via the injection motor E. When this drive element 19 rotates, the means of linear movement 16a moves at the same time. Then the spindle head 16c at the end of rod 16e rotates between the planet gears 16d, which causes a relative movement of spindle head 16c and planet gears 16d opposite the threaded case, mounted so it cannot turn on the support, element 16b that works with the means of linear movement 16a. If the plasticized material is injected, the dosing process starts over again.

Finally, to take the injection-molding unit off the mold again, one of the bore holes 36 in the cylinder space 28 to the right of the annular piston 30 is acted on now, which makes the injection-molding unit pull back.

It is obvious that this description can be subject to a wide variety of modifications, changes and adjustments, which fall into the area of equivalents to the pending claims.

What is claimed is:

1. An injection-molding unit for an injection-molding machine to process plastics and other plasticizable compounds, the unit comprising:

a carrier block to hold a plasticizing cylinder,
a conveyor arranged in the plasticizing cylinder along a injection axis to inject the plasticizable compound into a mold,
an injection bridge that moves axially along the injection axis, on which the conveyor is rotatably mounted with at least one bearing element,
an electromechanical injection unit to move the injection bridge axially, wherein a means of linear movement of the injection unit is rotatably mounted on the injection bridge via at least one bearing element,
a support to support the element that works with the means of linear movement so that the element cannot turn,
an injection motor, which turns the means of linear movement by means of a first drive element coaxial to the means of linear movement,
an electromechanical rotary motor, which turns the conveyor by means of another drive element coaxial to the conveyor and also to the first drive element,
force-transmission elements that have at least one axial bearing element, for transmitting the axial movement of the means of linear movement to the conveyor, characterized by the fact that the axial bearing element is arranged directly between the first drive element and the other drive element as a force-transmission element.

2. The injection-molding unit in claim 1, wherein the axial bearing element is designed as a means of separation for uncoupling the rotational movements of the drive elements.

3. The injection-molding unit in claim 1, wherein the injection motor and the rotary motor are largely structurally identical, and wherein these two motors are arranged symmetrically to a plane that goes through the injection axis.

4. The injection-molding unit in claim 1, wherein the first drive element and the other drive element are both arranged in a housing in the injection bridge.

5. The injection-molding unit in claim 1, wherein the drive elements, almost identical in terms of their diameter, are toothed wheels driven by intermediate toothed wheels of drive wheels of the injection motor or rotary motor.

6. The injection-molding unit in claim 5, wherein the two intermediate toothed wheels are structurally identical and are mounted in a housing in the injection bridge symmetrical to the injection axis turned roughly 180° to one another symmetrical to the injection axis.

7. The injection molding unit in claim 1, wherein the means of linear movement of the injection unit has a spindle head, which goes into the element designed as a threaded case that works with the means of linear movement.

8. The injection-molding unit in claim 7, further including several planet gears arranged between the spindle head and the threaded case that work with said spindle head and said threated case.

9. The injection-molding unit in claim 7, wherein the means of linear movement comprises a rod which holds the spindle head and is surrounded by a pipe supported on the injection bridge so it cannot turn that goes into the supporting element at each position of the injection unit.

10. The injection-molding unit in claim 8, wherein the means of linear movement are surrounded coaxially by a pipe supported on the injection bridge, said pipe going into the element designed as a threaded case that works with the means of linear movement, wherein the axial forces that are produced are transmitted from the threaded case via the planet gears and the spindle head to an axial bearing element and from it to the pipe.

11. The injection-molding unit in claim 1, further including a hydraulic piston/cylinder unit provided to set the injection-molding unit against the mold whose cylinders can move axially on the stationary piston rods designated as cross beams and form a frame with the carrier block and the supporting element.

12. The injection-molding unit in claim 11, wherein the carrier block is set up in the area near the front cylinder cover and the supporting element in the area near the rear cylinder cover and wherein the injection bridge is supported between the carrier block and the supporting element on the cylinders of the piston/cylinder unit so that the injection bridge can move axially and rotate.

13. The injection-molding unit in claim 1, wherein the injection motor and the rotary motor are connected to the injection bridge so they can move together and basically lie in the vertical projection of a plane extending between the two cross beams.

* * * * *